(12) United States Patent
Currell

(10) Patent No.: US 7,728,572 B2
(45) Date of Patent: *Jun. 1, 2010

(54) METHOD AND APPARATUS TO REDUCE MAXIMUM POWER FROM A POWER SUPPLY WITH TRANSITION REGION REGULATION

(75) Inventor: Richard W. Currell, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 11/966,882

(22) Filed: Dec. 28, 2007

(65) Prior Publication Data

US 2008/0100275 A1 May 1, 2008

Related U.S. Application Data

(63) Continuation of application No. 11/651,675, filed on Jan. 9, 2007, now Pat. No. 7,332,900, which is a continuation of application No. 11/150,329, filed on Jun. 10, 2005, now Pat. No. 7,180,280.

(51) Int. Cl.
*G05F 1/40* (2006.01)
*H02M 3/335* (2006.01)

(52) U.S. Cl. .................. 323/285; 323/284; 363/21.01

(58) Field of Classification Search ............... 323/282, 323/284, 285, 351, 266; 363/16, 21.01
See application file for complete search history.

(56) References Cited

U.S. PATENT DOCUMENTS

| | | | |
|---|---|---|---|
| 5,246,418 A | 9/1993 | Haynes et al. | |
| 5,949,213 A | 9/1999 | Lanni et al. | |
| 6,366,066 B1 | 4/2002 | Wilcox | |
| 6,472,855 B2 | 10/2002 | Ball | |
| 6,580,258 B2 | 6/2003 | Wilcox et al. | |

(Continued)

FOREIGN PATENT DOCUMENTS

EP 0 588 569 A 3/1994

(Continued)

OTHER PUBLICATIONS

European Search Report, European Patent Application No. 06252988.8, filed, Mailed Dec. 19, 2008.

(Continued)

*Primary Examiner*—Jessica Han
(74) *Attorney, Agent, or Firm*—Blakely Sokoloff Taylor & Zafman, LLP

(57) ABSTRACT

Techniques are disclosed to regulate the output power of a power supply. An example technique for regulating a power supply output includes regulating in response to a feedback signal an output current of a power supply in a regulated current region of operation if an output voltage of the power supply is less than a second transition voltage. The output voltage and the output current of the power supply are regulated in a transition region current region of operation in response to the feedback signal if the output voltage of the power supply is between first and second transition voltages or if the output current of the power supply is between first and second transition currents.

6 Claims, 5 Drawing Sheets

U.S. PATENT DOCUMENTS

| | | |
|---|---|---|
| 7,061,778 B2 | 6/2006 | Odell et al. |
| 7,180,280 B2 * | 2/2007 | Currell ........................ 323/285 |
| 7,332,900 B2 * | 2/2008 | Currell ........................ 323/285 |
| 7,541,793 B2 * | 6/2009 | Saeueng et al. ............. 323/284 |
| 2003/0197497 A1 | 10/2003 | Barcelo et al. |
| 2004/0257271 A1 | 12/2004 | Jacobson et al. |
| 2006/0164048 A1 | 7/2006 | Muterspaugh |

FOREIGN PATENT DOCUMENTS

| | | |
|---|---|---|
| EP | 0 696 832 A2 | 2/1996 |
| GB | 2 079 014 A | 1/1982 |

OTHER PUBLICATIONS

Kepco KLP, KLP 75-33-1200, KLP 150-16-1200, KLP 300-8-1200, www.kepcopower.com, Kepco, Inc., 131-38 Sanford Avenue, Flushing, NY 11352, U.S.A., 2004.

* cited by examiner

METHOD AND APPARATUS TO REDUCE MAXIMUM POWER FROM A POWER SUPPLY WITH TRANSITION REGION REGULATION

REFERENCE TO PRIOR APPLICATION

This application is a continuation of and claims priority to U.S. application Ser. No. 11/651,675, filed Jan. 9, 2007, now pending, which is a continuation of and claims priority to U.S. application Ser. No. 11/150,329 filed Jun. 10, 2005, now issued as U.S. Pat. No. 7,180,280.

BACKGROUND

1. Technical Field

The present invention relates generally to electronic circuits, and more specifically, the invention relates to switch mode power supplies.

2. Background Information

A common application for a switch mode power supply is a battery charger. The output power of a battery charger is usually controlled to provide regulated output voltage and regulated output current. The output voltage is regulated between a maximum and a minimum voltage over a range of output current. The output current is regulated between a maximum and a minimum current over a range of output voltage. A feedback signal is used to regulate the output of a switch mode power supply such that the output voltage and output current stay within the specified limits.

The switch mode power supply typically has a fault protection feature that prevents excessive output voltage and/or excessive output current in the absence of a feedback signal. Without this fault protection feature, the loss of the feedback signal could cause the output voltage and/or output current to go high enough to damage the output load (which could be a battery) and/or the switch mode power supply. With this fault protection feature, the absence of a feedback signal typically causes the switch mode power supply to operate in an auto-restart cycle that substantially reduces the average output voltage and/or output current until the feedback signal is restored.

Battery chargers usually exhibit an abrupt transition between the regulated output voltage and the regulated output current. That is, the locus of output voltage and output current plotted in Cartesian coordinates usually has a sharp corner of approximately 90 degrees at the point of transition that corresponds to the point of maximum output power.

The typical practice of designing a battery charger with a sharp transition between the regulated output voltage and the regulated output current can result in a product that costs more than necessary to meet the requirements. A controlled regulated transition from a regulated output voltage to a regulated output current can allow the use of lower cost components.

Low cost circuits that regulate output current typically have loose tolerances. Battery chargers that use such circuits must guarantee a minimum output current at one end of the tolerance range, and they must guarantee a maximum output current at the other end of the tolerance range. The need to consider the addition of tolerances in other parameters can cause the design to be capable of substantially higher power than necessary. Failure to deliver all the power required by the load will cause the power supply to lose regulation and to enter a self-protection mode. Higher power capability typically requires a larger magnetic component or a larger power switch, which raises the cost of the power supply.

BRIEF DESCRIPTION OF THE DRAWINGS

The present invention detailed illustrated by way of example and not limitation in the accompanying Figures.

DETAILED DESCRIPTION

Techniques are disclosed to provide a regulated transition between the regulated output voltage and regulated output current of a power supply, allowing a switch mode power supply to perform as a battery charger at a reduced cost. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It is possible to avoid the higher cost associated with higher power capability by using a regulated transition between the regulated output voltage and the regulated output current in accordance with the teachings of the present invention. The regulated transition maintains a feedback signal to avoid entering an auto-restart mode while it allows a reduction in the maximum power capability.

Every switched mode power supply has a maximum power capability that describes a boundary on the plot of output voltage and output current. In conventional designs, the maximum capability boundary is set beyond the point of maximum specified output power, which is the intersection of maximum specified output voltage and maximum specified output current. In embodiments of the present invention, the maximum capability boundary is set below the point of maximum specified output power, and uses a regulated transition between regulated output voltage and regulated output current to avoid loss of feedback signal that would cause the power supply to operate in a self-protection mode. As a result, the locus of output voltage and output current in the regulated transition can be made to follow a path below the maximum capability boundary to reduce the cost of the design according to embodiments of the present invention.

Figure 1:
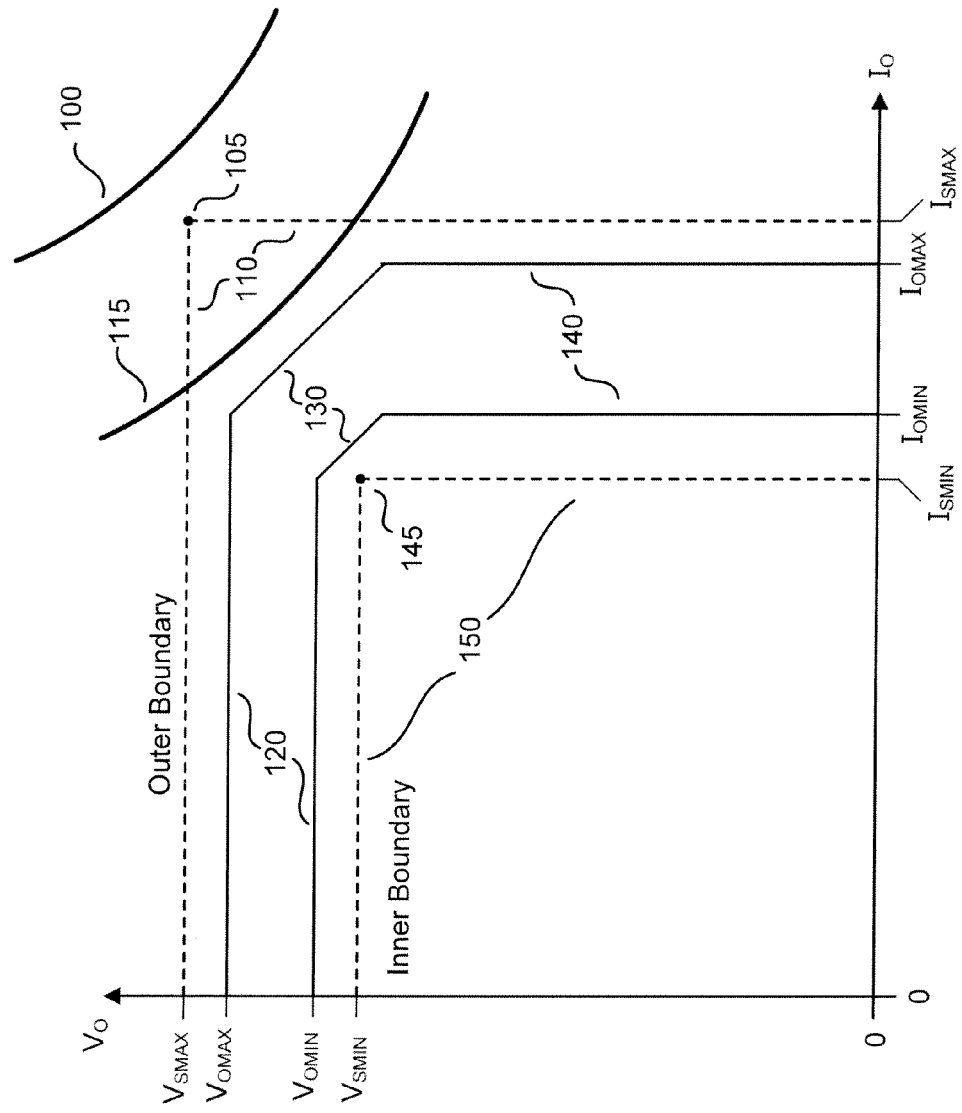
FIG. 1 shows boundaries of output voltage and output current for a power supply that could operate in accordance with the teachings of the present invention.

To illustrate, the broken lines in FIG. 1 show typical specification limits of output voltage and output current for a battery charger. The broken lines for $V_{SMAX}$ and $I_{SMAX}$ that define the specified outer boundary for operation intersect at a point 105 that is the outer maximum power point. The broken lines for $V_{SMIN}$ and $I_{SMIN}$ that define the specified inner boundary for operation intersect at a point 145 that is the inner maximum power point. The power supply need only operate between the outer boundary 110 and inner boundary 150 to meet the specified requirements.

In a typical switch mode power supply, a capability boundary 100 that describes maximum power capability of the power supply is set beyond the outer maximum power point 105 to guarantee regulated operation within the specified outer and inner boundaries 110 and 150 respectively. The use of a smaller transformer or a reduced peak current in the primary of the transformer can reduce the cost of the power supply, but these measures also reduce the maximum power capability of the power supply. The capability boundary for a reduced cost power supply can be within the boundaries of specified operation 110 and 150 as illustrated by the capability boundary 115 in accordance with the teachings of the present invention. FIG. 1 shows capability boundary 115 between the outer maximum power point 105 and the inner maximum power point 145. In order to maintain regulated operation, the output voltage and output current is controlled within boundaries such that the maximum output power remains below maximum capability boundary 115 in accordance with the teachings of the present invention.

In FIG. 1, solid horizontal lines 120 are the boundaries of a regulated voltage region between $V_{OMIN}$ and $V_{OMAX}$. Solid vertical lines 140 are the boundaries of a regulated current region between $I_{OMIN}$ and $I_{OMAX}$. Solid sloping lines 130 are the boundaries of a regulated transition region in accordance with the teachings of the present invention.

As shown in FIG. 1, the boundaries 130 of the regulated transition region are below the maximum capability boundary 115 and above inner maximum power point 145 to maintain operation within specifications. A designer may choose the regulation boundaries 120, 130, 140, and the position of the capability boundary 115 to achieve a reduced cost according to embodiments of the present invention. Use of a regulated transition region 130 of the proper shape allows the designer to manage tradeoffs between tolerances and cost for embodiments of the present invention.

Figure 2:
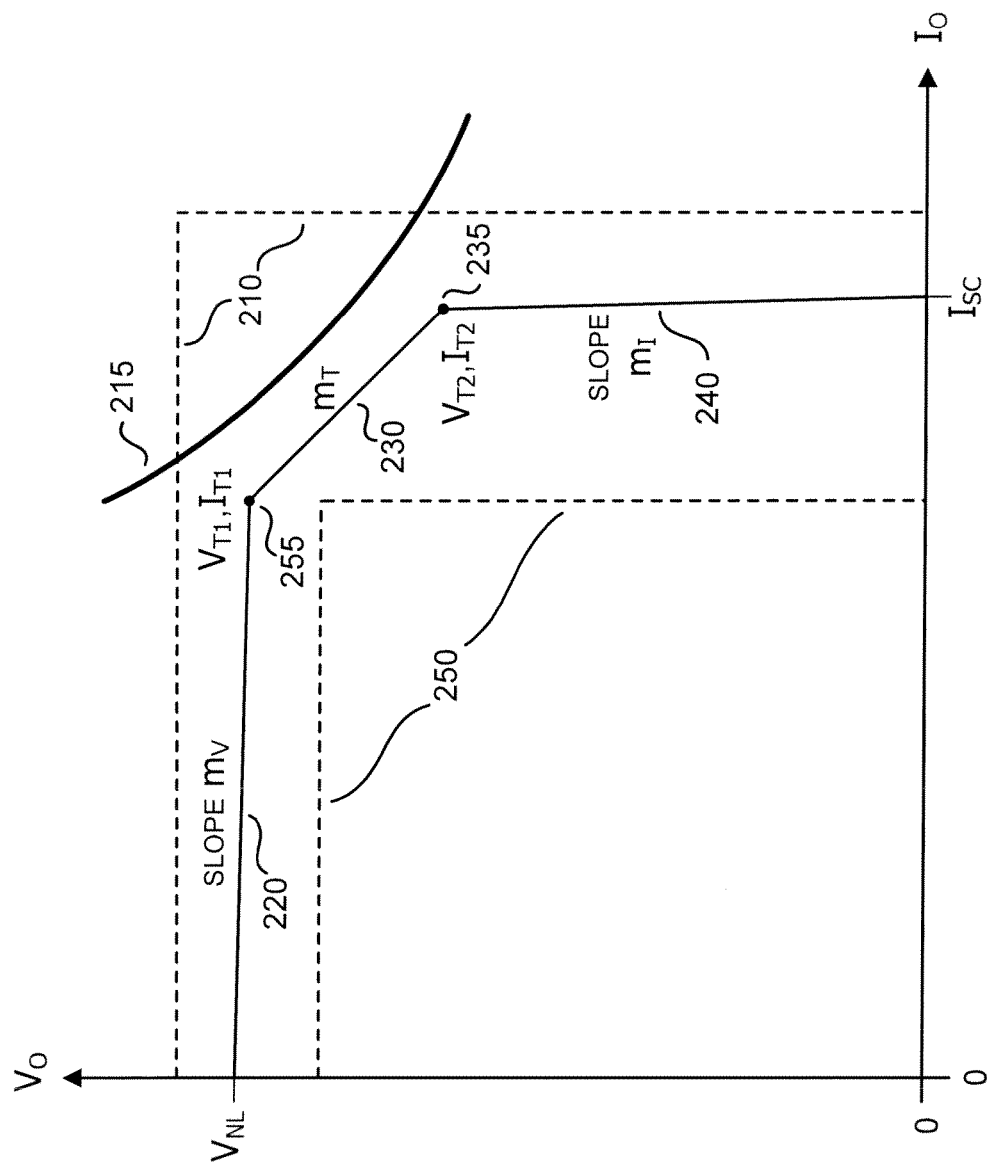
FIG. 2 shows the output characteristics of a power supply that operates within boundaries in accordance with the teaching of the present invention.

FIG. 2 shows the typical output characteristic of a power supply that has a regulated voltage region of operation, a regulated current region of operation, and a regulated transition region of operation in accordance with the teaching of the present invention. The power supply operates along line segment 220 having slope $m_V$ in the regulated voltage region of operation, regulating the output voltage from a voltage $V_{NL}$ at zero output current to a first transition voltage $V_{T1}$ at a first output transition current $I_{T1}$. Thus, in the illustrated example, the power supply operates in the regulated voltage region of operation along line segment 220 with slope $m_V$ if the output current of the power supply is less than the first output transition current $I_{T1}$. The power supply operates along line segment 230 having slope $m_T$ in the regulated transition region of operation, to regulate output voltage and output current between a first transition point 255 at a first output transition voltage $V_{T1}$ corresponding to a first output transition current $I_{T1}$, and a second transition point 235 at second output transition voltage $V_{T2}$ corresponding to a second output transition current $I_{T2}$. Thus, in the illustrated example, the power supply operates in the regulated transition region of operation along line segment 230 and restricts the voltage and current to be less than the maximum power capability of the power supply with slope $m_T$ if the output current of the power supply is between first output transition current $I_{T1}$ and the second output transition current $I_{T2}$ and/or if the output voltage of the power supply is between first output transition voltage $V_{T1}$ and the second output transition voltage $V_{T2}$. The power supply operates along line segment 240 having slope $m_I$ in the regulated current region of operation to regulate output current between $I_{T2}$ at the second transition point 235 and short circuit current $I_{SC}$ at zero output voltage. Thus, in the illustrated example, the power supply operates in the regulated current region of operation along line segment 240 with slope $m_I$ if the output voltage of the power supply is less than the second output transition voltage $V_{T2}$.

For embodiments of the present invention, simultaneous regulation of output voltage and output current allows a power supply with reduced power capability to satisfy requirements of battery chargers at lower cost than traditional designs. A regulated transition region between a voltage regulation region and a current regulation region allows the power supply to operate below the boundary of its maximum power capability. Signals from a voltage regulation circuit, a current regulation circuit, and a regulated transition circuit are summed to obtain a regulated transition region of the desired shape. Switch mode power supplies that operate with a regulated transition region can use smaller components to reduce the cost of power supply applications such as for example battery chargers or the like in accordance with the teachings of the present invention.

As shown in FIG. 2, the slope $m_V$ of line segment 220 in the regulated voltage region is not necessarily zero, and the slope $m_I$ of line segment 240 in the regulated current region is not necessarily infinite for embodiments of the present invention. Line segments 220 and 240 can have finite slopes or nonlinear characteristics as the result of non-ideal components or intentional shaping by the designer for particular applications. Line segment 230 can differ from a straight line to approximate more closely the curvature of the maximum capability boundary 215. The output voltage and output current remain between the lines of the inner specification boundary 250, the outer specification boundary 210, and below the maximum power capability boundary 215.

Figure 3:
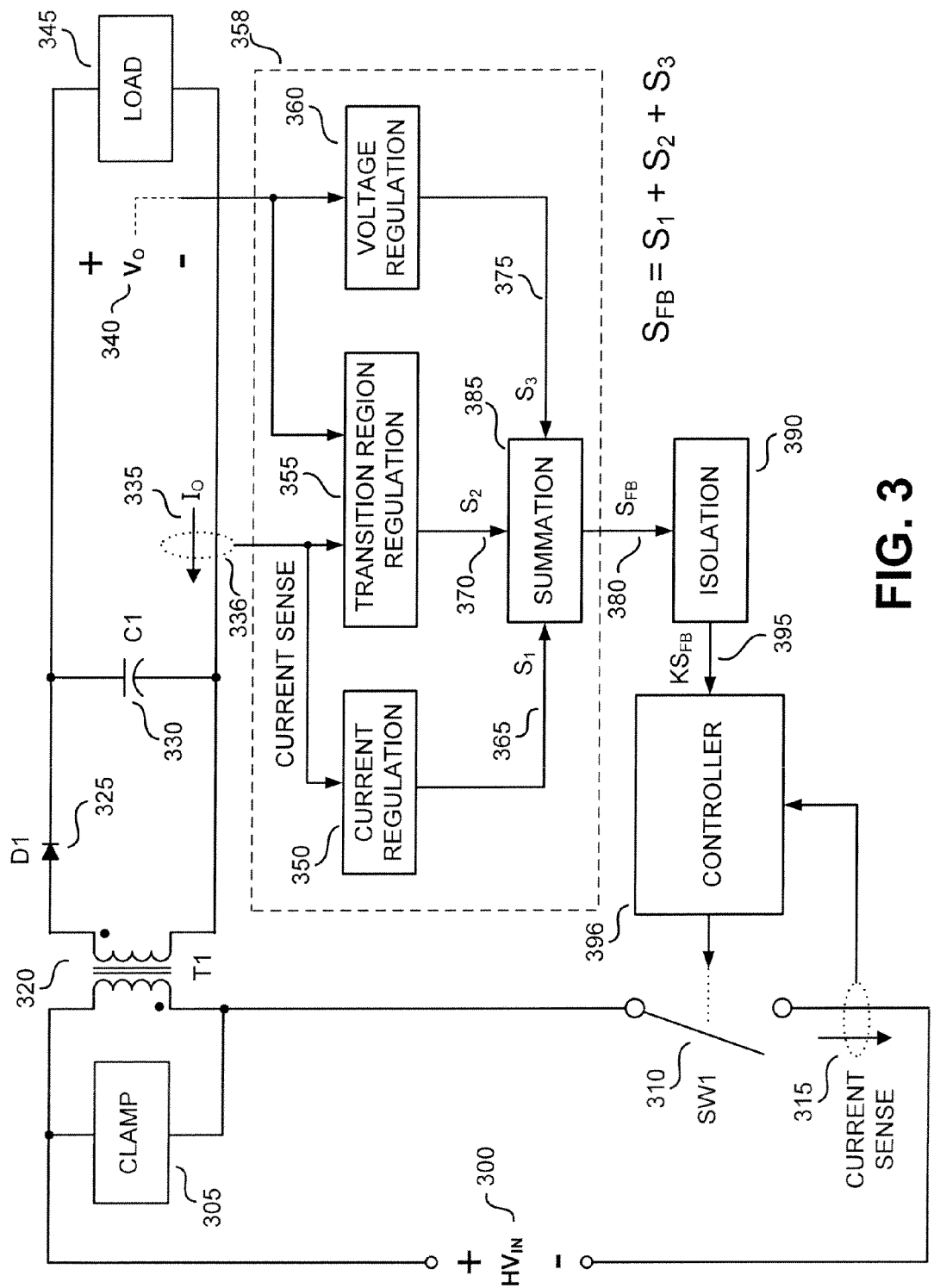
FIG. 3 is a functional block diagram of one example of a switch mode power supply that includes a transition region regulation feature in accordance with the teaching of the present invention.

FIG. 3 is a functional block diagram that uses the example of a flyback power supply to illustrate the principles in accordance with teachings of the present invention. The switch mode power supply illustrated in FIG. 3 is for an embodiment of the present invention that provides output power to a load 345 from an unregulated input voltage $HV_{IN}$ 300. For one embodiment, the load 345 may be for example a rechargeable battery. The input voltage $HV_{IN}$ 300 is coupled to an energy transfer element T1 320 and a switch SW1 310. In the illustration of FIG. 3, energy transfer element T1 320 couples energy from the input to the output of a switch mode power supply in response to the switching of switch SW1 310.

In the example of FIG. 3, the energy transfer element T1 320 is illustrated as a transformer with two windings. In general, this transformer can have more than two windings, with the additional windings providing power to additional loads, providing bias voltages, or sensing the voltage at a load. A clamp circuit 305 is coupled to the primary winding of the energy transfer element T1 320 to control the maximum voltage on the switch SW1 310.

Switch SW1 310 is switched on and off in response to the controller 396 in accordance with the teachings of the present invention to regulate the output of the switched mode power supply. For one embodiment, switch SW1 310 is a transistor. For one embodiment, switch SW1 310 is a power metal oxide semiconductor field effect transistor (MOSFET). For one embodiment, the controller 396 includes an integrated circuit or discrete electrical components or both an integrated circuit and discrete electrical components. For one embodiment, an integrated circuit includes controller 396 and switch SW1 310.

The operation of switch SW1 310 produces pulsating current through the energy transfer element to a rectifier D1 325 that is filtered by a capacitor C1 330 to produce a substantially constant output that may be an output voltage $V_O$ 340 or a substantially constant output current $I_O$ 335 or a combination of output $V_O$ 340 and $I_O$ 335 to the load 345.

As shown in FIG. 3, a feedback circuit 358 is coupled to sense the output and generate a feedback signal 380 in response to sensing the output voltage $V_O$ 340 and/or a current sense signal 336. For one embodiment, feedback signal 380 is active or non-zero during all regions of operation including operation of the power supply along line segments 220, 230 and 240 of FIG. 2 when regulating the output of the power supply. For one embodiment, feedback circuit 358 includes current regulation block 350, transition regulation block 355, voltage regulation block 360 and summation block 385. For one embodiment, the output voltage $V_O$ 340 is used as a signal for voltage regulation block 360 and transition region regulation block 355. Output current sense 336 is used as a signal to current regulation block 350 and to transition region regulation block 355.

A regulation signal $S_1$ 365 from the current regulation block 350, a regulation signal $S_2$ 370 from the transition region regulation block 355, and a regulation signal $S_3$ 375 from the voltage regulation block 360 are combined in a summation block 385. For embodiments of the present invention, transition region regulation block 355 provides regulated operation of the power supply with feedback in the transition region of operation along for example line segments 130 of FIG. 1 or line segment 230 of FIG. 2 in accordance with the teachings of the present invention. As a result, there may be non-zero or active feedback signal provided by transition region regulation block 355 in the transition region of operation. The regulated transition region along line segment 230 allows the power supply to restrict the voltage and current to be less than the maximum power capability of the power supply in accordance with the teachings of the present invention. The output of the summation block is a feedback signal $S_{FB}$ 380 that that is received by isolation block 390.

Isolation block 390 transmits signals across the electrical isolation barrier that separates circuits referenced to the primary of transformer T1 320 from circuits referenced to the secondary of transformer T1 320. Accordingly, for one embodiment, isolation block 390 provides isolation between the input and the output of the power supply illustrated in FIG. 3. The output of the isolation block is a scaled feedback signal $KS_{FB}$ 395 that goes to a controller 396. For some embodiments, isolation block 390 is not necessarily required in which case controller 396 receives feedback signal $S_{FB}$ 380. An output of controller block 396 is coupled to switch the switch SW1 310 in response to the feedback signal $S_{FB}$ 380 or the scaled feedback signal $KS_{FB}$ 395 to regulated the output of the switch mode power supply in accordance with the teachings of the present invention.

Figure 4:
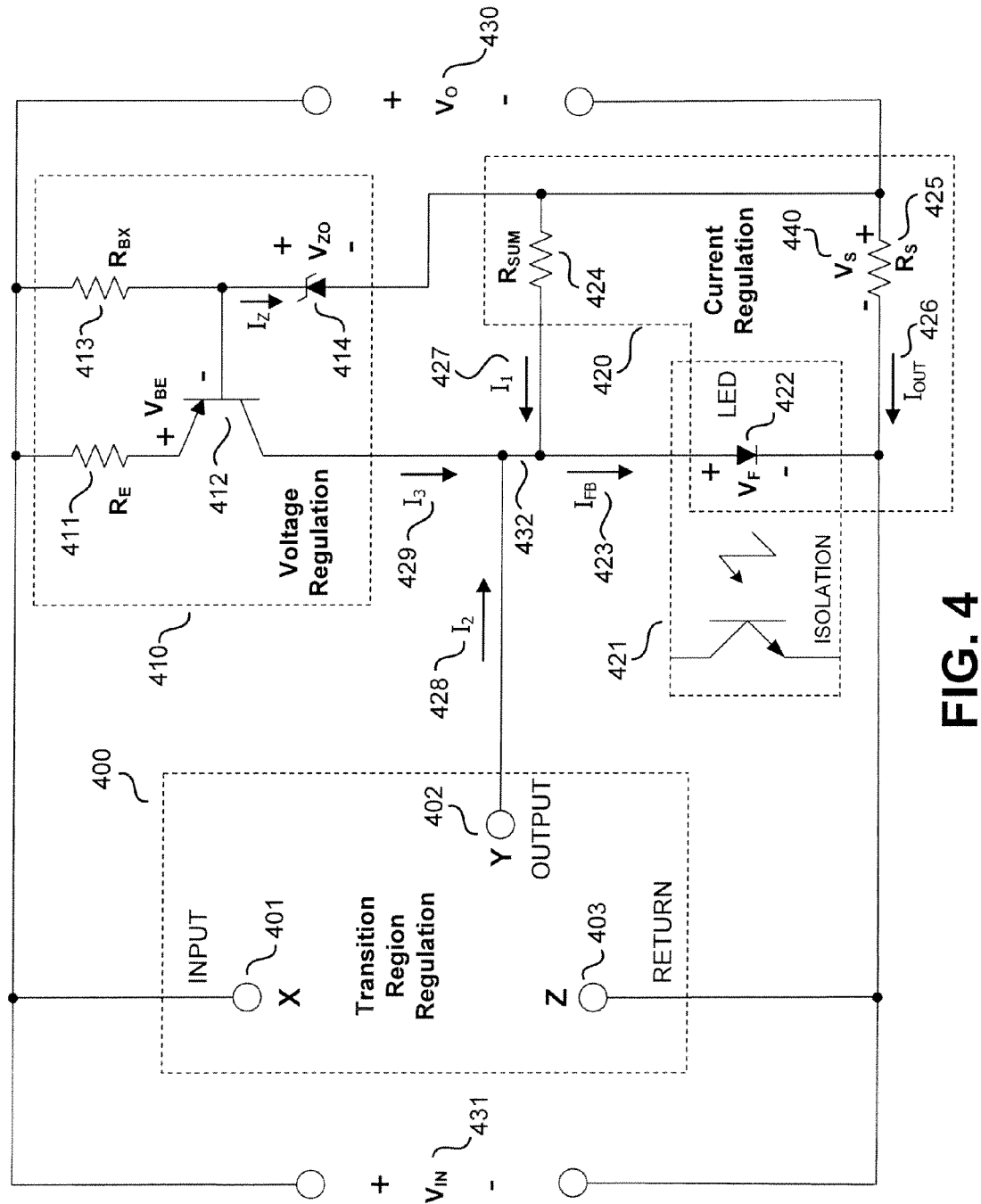
FIG. 4 shows one example of three regulation feedback circuits including transition region regulation for a power supply in accordance with the teachings of the present invention.

FIG. 4 shows some example circuits for voltage regulation 410 and current regulation 420 that may be used with circuits for transition region regulation 400 for various embodiments of the invention. Circuits 420, 400, and 410 may correspond respectively to blocks 350, 355, and 360 in feedback circuit 358 of FIG. 3 in accordance with the teachings of the present invention.

As shown in the illustrated examples, the output current regulation circuit 420 includes a current sense resistor $R_S$ 425, current summation resistor $R_{SUM}$ 424, and light emitting diode LED 422 of optocoupler 421. The current regulation circuit 420 provides an output $I_1$ 427 that may correspond to signal $S_1$ 365 in the functional block diagram of FIG. 3.

Output voltage regulation circuit 410 includes a Zener diode 414 having a Zener voltage $V_{ZO}$ at a Zener current $I_Z$, a Zener diode bias resistor $R_{BX}$ 413, a PNP bipolar transistor 412, and an emitter resistor $R_E$ 411. Voltage regulation circuit 410 provides an output current $I_3$ 429 that may correspond to signal $S_3$ 375 in the functional block diagram of FIG. 3.

Various embodiments of transition region regulation circuits 400 receive an input voltage at a terminal X 401 with respect to a return terminal Z 403 to provide a current to an output terminal Y 402. The output current $I_2$ 428 from transition regulation circuit 400 may correspond to signal $S_2$ 370 in the functional block diagram of FIG. 3.

Node 432 of FIG. 4 is a summation node that may correspond to summation block 385 of FIG. 3. Node 432 sums currents $I_1$ 427, $I_2$ 428, and $I_3$ 429 to produce the feedback current $I_{FB}$ 423 that corresponds to signal $S_{FB}$ 380 in the functional block diagram of FIG. 3. Feedback current $I_{FB}$ is at its regulated value $I_{FBR}$ when the power supply is regulating the output. $I_{FBR}$ is the value of current $I_{FB}$ 423 in the LED 422 of the optocoupler 421 to maintain a regulation, which is known to the designer for a given applications.

Optocoupler 421 is used for one embodiment to isolate the output circuits and output load from the input circuits of the switch mode power supply. Optocoupler 421 in FIG. 4 corresponds to the isolation block 390 in FIG. 3.

In FIG. 4, input voltage $V_{IN}$ 431 differs from regulated output voltage $V_O$ 430 only by the voltage $V_S$ 440 across the current sensing resistor $R_S$ 425. For one embodiment, the output load current $I_{OUT}$ 426 is sensed as a voltage $V_S$ 440 across the current sense resistor $R_S$ 425, that produces current $I_1$ 427 through the summation resistor $R_{SUM}$ 424 to $I_{FB}$ 423. For one embodiment, the forward voltage $V_F$ of the LED 422 of optocoupler 421 is the reference voltage for current regulation. For one embodiment, the power supply operates in the regulated current region when current $I_1$ 427 reaches the value $I_{FBR}$. For one embodiment, the voltage across summation resistor $R_{SUM}$ 424 is typically 10% of the current regulation reference voltage $V_F$ for acceptable power dissipation in resistor $R_S$ 425. For one embodiment, the voltage across the current sense resistor $R_S$ 425 is therefore approximately 1.1 times $V_F$ when the power supply operates in the regulated current region.

Figure 6:
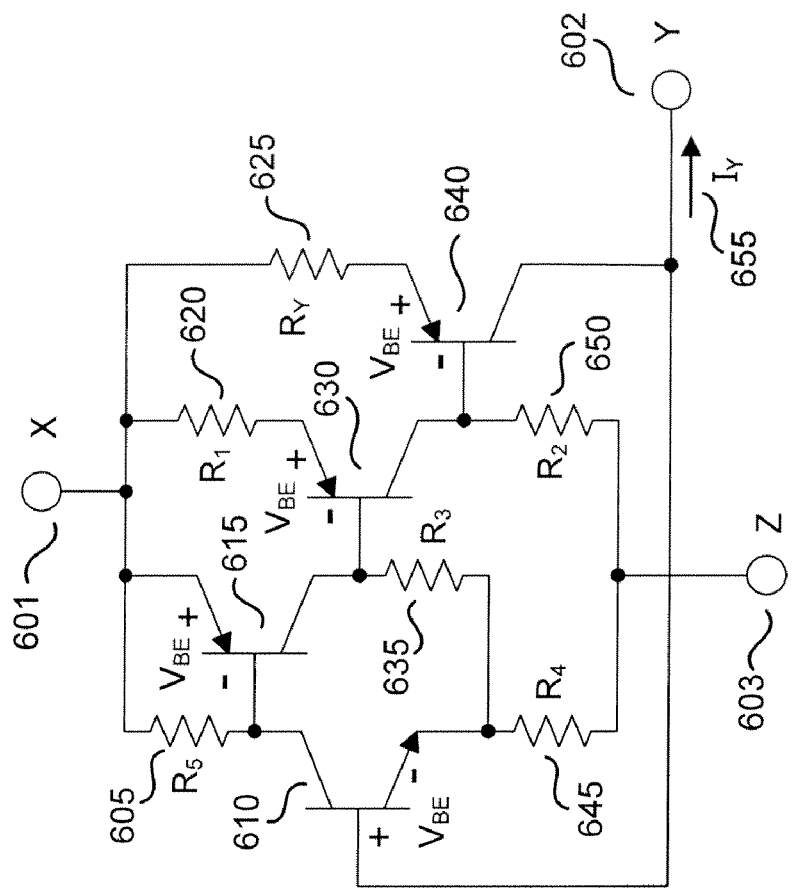
FIG. 6 is another example of a circuit for transition region regulation in accordance with the teachings of the present invention.
Figure 5:
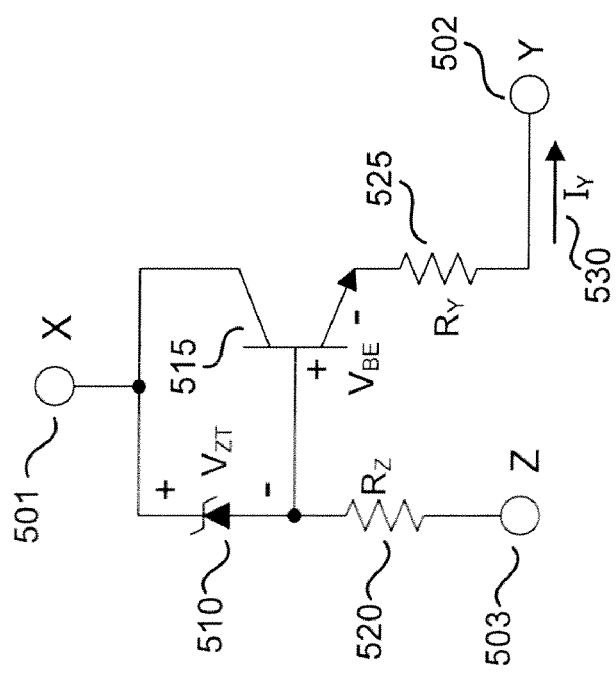
FIG. 5 is one example of a circuit for transition region regulation in accordance with the teachings of the present invention.

Examples of transition region regulation circuits 400 in FIG. 4 are shown in FIG. 5 and FIG. 6 for an embodiment of the present invention. Transition region regulation provides regulated output power using low cost loose tolerance components while operating within the specified voltage and current boundaries and below the maximum capability boundary 215 shown in FIG. 2 in accordance with the teachings of the present invention. The transition region regulation circuit 400 in FIG. 4 injects current from the X input 401 through the Y output 402 into the summing node 432 to simultaneously regulate the output voltage and output current as the load changes, while remaining below the maximum capability boundary 215 shown in FIG. 2 in accordance with the teachings of the present invention.

To illustrate, FIG. 5 is an example of a circuit for transition region regulation in accordance with the teachings of the present invention. The example circuit of FIG. 5 sets voltage $V_{T2}$ of the second transition point 235 of FIG. 2 and sets the slope $m_T$ of the line segment 230, keeping both substantially fixed in response to tolerance variations that may change $V_{NL}$, $V_{T1}$, $I_{T1}$, and $I_{SC}$.

As shown, the example circuit of FIG. 5 includes a Zener diode 510 having Zener voltage $V_{ZT}$, a bias resistor $R_Z$ 520, an NPN transistor 515 having a base to emitter voltage $V_{BE}$, and an emitter resistor $R_Y$ 525. The terminals X 501, Y 502, and Z 503 may correspond respectively to terminals X 401, Y 402, and Z 403 in FIG. 4. The Zener voltage $V_{ZT}$ of Zener diode 510 plus the $V_{BE}$ of NPN transistor 515 establishes the voltage $V_{T2}$ of the second transition point 235 of FIG. 2. Resistor $R_Y$ 525 establishes the slope of line segment 230 in FIG. 2. Bias resistor 520 establishes a current in Zener diode 510 to obtain desired characteristics of the Zener voltage $V_{ZT}$.

For an embodiment that uses the circuits of FIG. 4 with the transition region regulation circuit of FIG. 5, current $I_Y$ 530 in FIG. 5 is the current $I_2$ 428 in FIG. 4 that may correspond to signal $S_2$ 370 in FIG. 3. The output is regulated when $I_{FB}$ 423 is at the value $I_{FBR}$, which will be a known value for a particular application for an embodiment of the present invention. The voltages $V_{T1}$ and $V_{T2}$ at the transition points 255 and 235 in FIG. 2 are given approximately by Equation 1 and Equation 2 from the values in FIG. 4 and FIG. 5.

$$V_{T1} = V_{ZO} + V_{BE} \quad (1)$$

$$V_{T2} = V_{ZT} + V_{BE} + V_F \quad (2)$$

Appropriate values for $V_{ZO}$ and $V_{ZT}$ may be chosen to obtain the desired values for $V_{T1}$ and $V_{T2}$ in the presence of $V_{BE}$ and $V_F$ for an embodiment of the present invention. For a given $V_{T1}$, $I_{T1}$, and $I_{SC}$, the designer chooses a slope $m_T$ of the line segment 230 to achieve a desired regulated transition region. Resistor $R_{SUM}$ 424 in FIG. 4 may be selected in accordance with the known values $V_F$ and $I_{FBR}$ as $$R_{SUM} = 0.1 \frac{V_F}{I_{FBR}} \quad (3)$$

and the value of $R_S$ is computed approximately from the expression:

$$R_S = 1.1 \frac{V_F}{I_{SC}} \quad (4)$$

where $I_{SC}$ may be a short circuit output current value chosen by the designer.

The values of $I_{T1}$ and $I_{T2}$ may be determined from the slopes $m_T$ and $m_I$ of the line segments 230 and 240 respectively as shown in FIG. 2. For the example circuit of FIG. 5, line segment 240 in the current regulation region is substantially vertical such that $I_{T2}$ is approximately $I_{SC}$. The value of $I_{T1}$ is determined from $V_{T2}$ and $I_{T2}$ by $V_{T1}$ and the slope $m_T$ of line segment 230.

The slope $m_T$ of line segment 230 in the regulated transition region for the embodiment of FIG. 5 is given approximately by the expression:

$$m_T = \frac{V_{T2} - V_{T1}}{I_{T2} - I_{T1}} = -R_S \left( \frac{R_Y}{R_{SUM}} + 1 \right) \quad (5)$$

The voltage $V_{NL}$, which is the value of $V_O$ when $I_O$ is zero, is determined from $V_{T1}$ with $I_{T1}$ and the slope of line segment 220 in the regulated voltage region. The slope $m_V$ of line segment 240 in the regulated voltage region is given approximately by the expression:

$$m_V = \frac{V_{T1} - V_{NL}}{I_{T1}} = -R_S \frac{R_Y \| R_E}{R_Y \| R_{SUM}} \quad (6)$$

where the notation A‖B represents the equivalent parallel combination of components A and B. The designer adjusts parameters with the aid of Equations 1 through 6 to achieve the desired characteristics of the regulated output in accordance with the teachings of the present invention.

FIG. 6 is another example of a circuit for transition region regulation in accordance with the teachings of the present invention. The example circuit of FIG. 6 with the example of FIG. 4 allows $V_{T2}$ and $I_{T2}$ to change such that the transition point 235 moves along the slope $m_T$ of the substantially fixed line segment 230 in response to tolerance variations that may change $V_{NL}$, $V_{T1}$, $I_{T1}$, and $I_{SC}$.

The example circuit of FIG. 6 uses transistors 610, 615, and 630 with resistors $R_1$ 620, $R_2$ 650, $R_3$ 635, $R_4$ 645, and $R_5$ 605 to apply a voltage substantially proportional to $V_F$ at the base of transistor 640. The terminals X 601, Y 602, and Z 603 correspond respectively to terminals X 401, Y 402, and Z 403 in FIG. 4. Resistor $R_Y$ 625 establishes the slope $m_T$ of line segment 230 in FIG. 2.

In an embodiment that uses the circuits of FIG. 4 with the transition region regulation circuit of FIG. 6, current $I_Y$ 655 in FIG. 6 is the current $I_2$ 428 in FIG. 4 that corresponds to signal $S_2$ 370 in FIG. 3. As with the example of FIG. 5, the output is regulated when $I_{FB}$ 423 is at the value $I_{FBR}$. A designer will know the value $I_{FBR}$ for a particular application. Equation 1 gives approximately the voltage $V_{T1}$ of the first transition point 255 in FIG. 2 for the transition region regulation circuit of FIG. 6 as it does for the example of FIG. 5. For a given $V_{T1}$, $I_{T1}$, and $I_{SC}$, the designer chooses a slope $m_T$ of the line segment 230 to achieve a desired regulated transition region. The values of $R_{SUM}$ 424 and $R_S$ 425 are computed from Equation 3 and Equation 4 respectively. The value of $R_Y$ 625 is computed from Equation 7

$$R_Y = R_{SUM} \left( 1 - \frac{R_2}{R_1} \right) \left( \frac{-m_T}{R_S} - 1 \right) \quad (7)$$

where the slope $m_T$ is a negative quantity. Resistors $R_1$ 620 and $R_2$ 650 are selected for linear operation of transistor 630 throughout the regulated transition region. Typically $R_1 = 2R_2$ with values as high as practical to guarantee the desired operation.

Resistors $R_3$ 635 and $R_4$ 645 are selected with the ratio computed from Equation 8 with values typically as high as practical to guarantee the desired operation.

$$\frac{R_3}{R_4} = \left(\frac{R_Y}{R_{SUM}}\right)\left(\frac{R_1}{R_2}\right) - 1 \qquad (8)$$

The voltage $V_{NL}$, which is the value of $V_O$ when $I_O$ is zero, is determined from $V_{T1}$ and $I_{T1}$ with the slope $m_V$ of line segment 220 in the regulated voltage region. Slope $m_V$ is given approximately by Equation 6. Resistor R5 605 provides a path for the leakage current of transistor 615. One skilled in the art will choose an appropriate value for R5 605 when it is necessary for a particular application.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A method of regulating a power supply output, comprising:
   regulating in response to a feedback signal an output current of a power supply in a regulated current region of operation if an output voltage of the power supply is less than a second transition voltage; and
   regulating in response to the feedback signal the output voltage of the power supply and the output current of the power supply in a transition region current region of operation if the output voltage of the power supply is between first and second transition voltages or if the output current of the power supply is between first and second transition currents.

2. The method of regulating the power supply output of claim 1 further comprising switching a power switch coupled to an energy transfer element at an input of a power supply in response to the feedback signal.

3. The method of regulating the power supply output of claim 1 further comprising generating the feedback signal in response to the power supply output.

4. The method of regulating the power supply output of claim 1, wherein generating the feedback signal comprises:
   sensing the output voltage and output current of the power supply;
   generating a voltage regulation signal in response to the output voltage of the power supply;
   generating a current regulation signal in response to the output current of the power supply;
   generating a transition region regulation signal in response to the output voltage and the output current of the power supply; and
   summing the voltage regulation signal, the current regulation signal and the transition region regulation signal.

5. The method of regulating the power supply output of claim 1 further comprising regulating in response to the feedback signal the output voltage of the power supply in a regulated voltage region of operation if the output current of the power supply is less than the first transition current.

6. The method of regulating the power supply output of claim 1 further comprising isolating an input of the power supply from the power supply output.

* * * * *